Feb. 18, 1969  L. D. BECKERLE  3,428,503

THREE-DIMENSIONAL REPRODUCTION METHOD

Filed Oct. 26, 1964

INVENTOR.
LLOYD D. BECKERLE
BY
William C. Babcock
ATTORNEY

Feb. 18, 1969   L. D. BECKERLE   3,428,503
THREE-DIMENSIONAL REPRODUCTION METHOD
Filed Oct. 26, 1964   Sheet 2 of 2
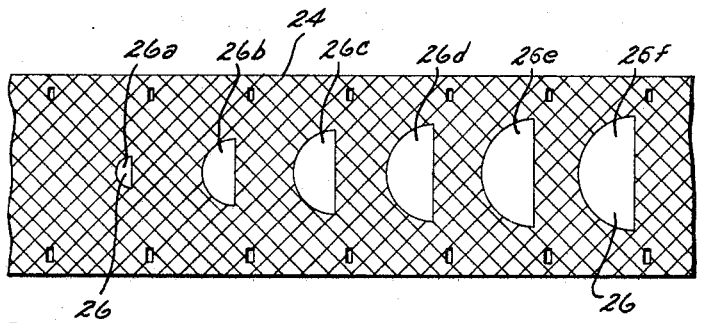
FIG.3
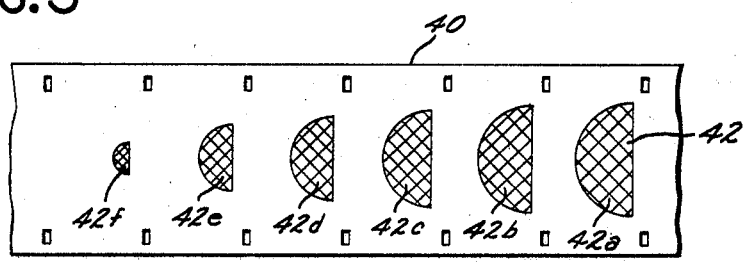
FIG.4
FIG.8   FIG.9   FIG.10
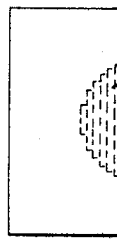 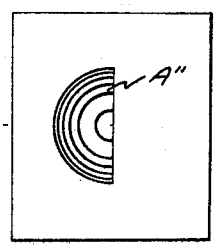 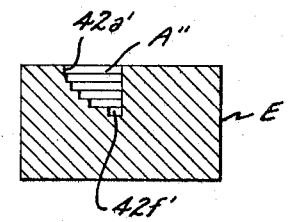
FIG.11   FIG.12
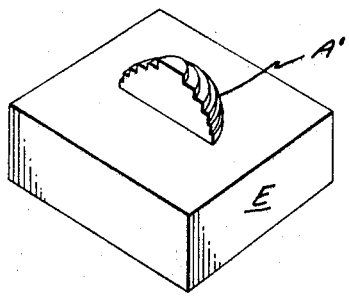 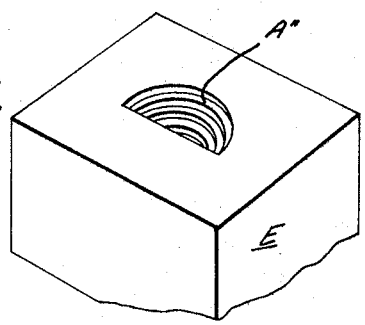
INVENTOR.
LLOYD D. BECKERLE
BY
William C. Babcock
ATTORNEY United States Patent Office 3,428,503
Patented Feb. 18, 1969

3,428,503
THREE-DIMENSIONAL REPRODUCTION METHOD
Lloyd D. Beckerle, 11902 Paseo Bonita,
Los Alamitos, Calif. 90720
Filed Oct. 26, 1964, Ser. No. 406,257
U.S. Cl. 156—11                                6 Claims
Int. Cl. B44b 1/04; B32b 3/00

ABSTRACT OF THE DISCLOSURE

A method for creating three-dimensional reproductions wherein both photography and etching are employed. The result is obtained by disposing a plurality of unexposed photographic films at a fixed location from an object to be reproduced, applying a beam of light upon the object to illuminate the same, exposing said films in sequence to the lighted sections of the object, developing said films after exposure and subsequently, photographically reproducing the images of the films upon an etchable block which is etched to produce the desired three-dimensional reproduction.

---

A primary object of the present invention is to provide a novel method by means of which both photography and etching are employed to reproduce any desired object in three-dimensional form.

Another object of the present invention is to furnish a method of reproducing any desired object in three-dimensional form in any desired size by the use of standard, commercially available equipment and materials.

Another object of the invention is to supply a method for reproducing three-dimensional objects that can be carried out by but a single operator, or if desired, by automated electrical or automated mechanical equipment, requires no extensive training of personnel, and assures a three-dimensional reproduction that is accurate dimensionally and free of distortion.

These and other objects and advantages of the invention will become apparent from the following description thereof and from the accompanying drawings illustrating the same, in which:

FIGURE 3 is a top plan view of a section of positive negative motion picture film from the camera shown in FIGURE 1 on which the lighted sections of the sphere is reproduced as transparent images thereon, which negative results from the exposure of a reversal type film;

FIGURE 4 is a section of negative motion picture film taken by the camera shown in FIGURE 1, on which the lighted areas of the sphere have been reproduced as a series of light opaque images;

FIGURE 8 is a side elevational view of a block that has been etched to reproduce as a concavity the configuration of the quadrant of the object shown in FIGURE 1;

FIGURE 9 is a top plan view of the cavity shown in FIGURE 8;

FIGURE 10 is a vertical cross-sectional view of the block shown in FIGURE 9, taken on the line 10—10 thereof;

FIGURE 11 is a perspective view of the reproduction illustrated in FIGURES 6 and 7;

Figure 13:
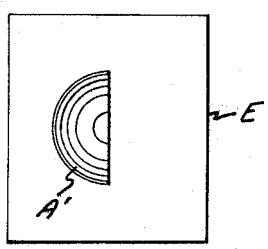

FIGURE 12 is a perspective view of the block with the cavity therein as shown in FIGURES 8–10 inclusive; and FIGURE 13 is an enlarged view of the reproduction as it actually appears after an etching operation, showing the rounded corners resulting from the etch, rather than the sharp angular steps shown in phantom line, and the magnitude of this rounding being controlled, to a degree, by the sharpness of the edges of the illuminated areas on the object being reproduced.

Figure 1:
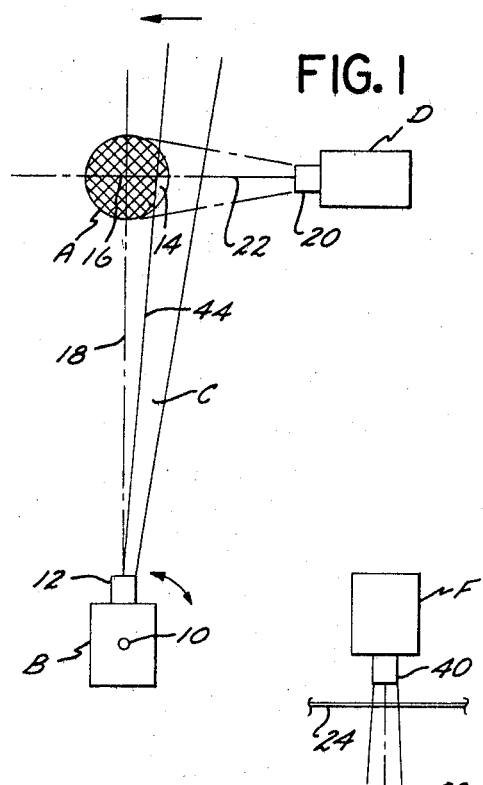
FIGURE 1 is a top plan view of a light projector and motion picture camera arranged to sequentially photograph lighted sections of a quadrant of an object, in this case a sphere, as a beam of light from the projector sweeps thereacross.

With continuing reference to the drawings for the general arrangement of the invention, the object A to be reproduced is shown in FIGURE 1. A light projector B of conventional design is provided that is disposed in substantially the same plane as the object A, but in spaced relationship relative thereto. The projector B rests on a conventional pivotal support 10 on which the projector may be moved in a horizontal plane in either a clockwise or counter clockwise direction.

The projector B incorporates a conventional lens system 12, or other conventional means for producing a sharply defined beam of light C, which as can be seen in FIGURE 1, may be swept across the object A in steps to sequentially illuminate sections 14 thereof. The pivotal support 10 and the center 16 of object A lie on a common centerline 18, as best shown in FIGURE 1. If desired, the projector B may be held stationary, and the light beam C sequentially moved across the image A by interposing frames of film (not shown) in front of the lens system 12, with each frame having a blanked out portion of a width different than that on the balance of the frames.

A conventional motion picture camera D is provided, the lens system 20 of which is focused to photograph the adjacently disposed semi-spherical surface of the sphere or object A. A longitudinally extending center line 22 of the motion picture camera D passes through the center 16 of the object A. The motion picture camera D and the projector B lie in substantially the same plane.

The camera D is loaded with a positive type film 24, a section of which is shown in FIGURE 3. The first step in reproducing the object A is to start the camera D and concurrently sweep the beam C across the lower right-hand quadrant of the object A as illustrated in FIGURE 1, until the quadrant is fully illuminated. In this manner a series of photographs of the lower right-hand quadrant of the object A are obtained in timed intervals, with the photographs of the lighted sections of the object being reproduced on the film 24 as light transparent images 26.

A block E is employed, the upper flat surface 28 of which is initially coated with a layer of photosensitive resist material 30 of a type that is commercially available and commonly used in the preparation of etched circuits. The block E is preferably held in a stationary position by means (not shown), and is adapted to be subjected to a liquid etching fluid 32 disposed in a container 34. If desired, the etchant may be sprayed on the surface 28 by means (not shown). Also, an electro-etching process (not shown) may be employed in which the removed material is carried by an electric current to a cathode. By means (not shown) container 34 can be moved upwardly and downwardly relative to the block E to bring the etching material 32 into contact with the upper surface thereof.

The sides and bottom of the block E are covered with a protective sheath 36 that is resistant to the action of the etching material 32. A second light projector F is adjustably supported above the block E by means not shown, as can best be seen in FIGURE 5, and is adapted to project a beam of light 38 downwardly onto the layer 30. The film 24 is so supported that each frame thereof can be intermittently interposed in the light beam 38 to project the image 26 thereon onto the resist material 30. When the resist material 30 is subjected to light it becomes insoluble in the etching material 32.

In carrying out the method of the present invention, the film 24 is intermittently moved relative to the lens assembly 40 of the second projector F, to first interpose the frame of the film 24 on the left-hand end thereof (FIGURE 3) in the light beam 38. The only light then falling on the resist material 30 will be the light image 26a. For the sake of clarity herein, the light images 26 shown in FIGURE 3 are further identified by the numerals 26a to 26f inclusive.

Figure 6:
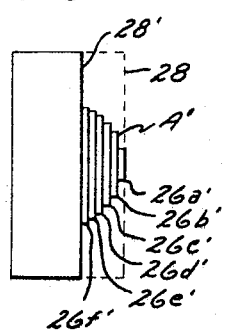
FIGURE 6 is a side elevational view of the block shown in FIGURE 5 after portions thereof have been etched away to define a reproduction of a part of the object shown in FIGURE 1.

After the resist 30 has been exposed to the light image 26a, the block E is subjected to the etching material 32, which etches into the block a predetermined depth, with the exception of that portion of the block identified in FIGURE 6 by the numeral 26a' that is situated under the light exposed portion of the resist 30. The entire upper surface of the block E is covered with a new layer of resist material and the above described operation repeated, but with the film having been moved to a position where the light image 26b is cast upon the new layer of resist material.

Figure 7:
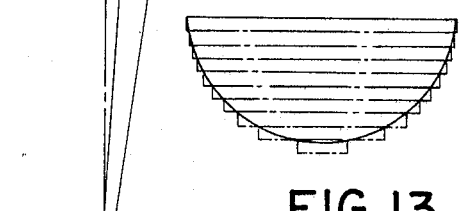
FIGURE 7 is a top plan view of the reproduction of the object on the block shown in FIGURE 6.

This operation is continued until all of the light images 26a to 26f have been interposed in the beam 38 and reproduced on new layers of resist material 30 in the manner described. At this point, a quadrant of the object A will have been reproduced on the block E as a series of stepped layers 26a' to 26f' inclusive, as can be seen in FIGURES 6 and 7, as well as in perspective in FIGURE 11.

In carrying out the process, the block E is subjected to the action of the etching material 32 for substantially the same time interval in each of the above described steps. The dotted line in FIGURE 6 illustrates the original position of the upper flat surface 28, with the solid line 28' illustrating the position of the surface of the block E after the etching operation has been completed. The reproduced portion of the object A on the block E is generally identified in FIGURES 6, 7 and 11 by the letter A'.

If instead of using the positive type film 24 above described, a film 40 is used as shown in FIGURE 4 on which the illuminated portions 14 of the object A are reproduced as light opaque images 42, a completely different result is obtained by means of the method of the present invention. The images 42 on film 40 are further identified by the notations 42a' to 42f' inclusive.

Figure 5:
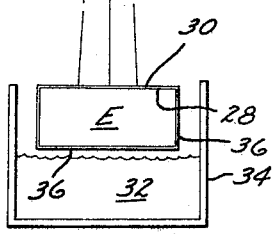
FIGURE 5 is a side elevational view of a second light projector directing a beam of light through the negative shown in FIGURE 3 to reproduce images thereon on a surface of an etch resist layer covering the upper surface of an etchable block.

When the film 40 is used in the manner shown in FIGURE 5, and the block E is subjected to the same type of etching operation, a reproduction of the object A is secured in the form of a cavity A" as shown in FIGURES 8, 9 and 12. It will be obvious in practicing this method that the lesser the thickness of the steps 26a' to 26f' inclusive, the truer will be the reproduction of the object A. From experience it has been found that each etching step should be of such time duration that approximately one-thousandths of an inch of the block E is removed each time one of the steps 26a' to 26f' is formed, or steps 42a' to 42f' is etched in the block E as shown in FIGURE 10. If the boundary line 44 of the beam C as shown in FIGURE 1 is slightly diffused, each section 14 of the object A will be partially illuminated by a gray area, which will be reflected in the images 26a to 26f inclusive in a boundary line that is less sharp than shown in FIGURE 3. When these images are imposed on the photosensitive resist material 30, this diffused boundary line will minimize the formation of the sharp angular steps, and these steps will be slightly rounded as shown in FIGURES 6, 7, 11 and 13.

Also in practice, the sharply defined steps shown in FIGURES 6, 7 and 11 are not obtained, for the etching action of the material 32 will tend to round the corners defining the steps, rather than leaving them sharp and well defined. When the object A is one that defines a surface of revolution, the photographing of a single quadrant thereof results in the reproduction of one-quarter of the object A as shown in FIGURES 6, 7 and 11, as well as in the concave form shown in FIGURES 8, 9, 10 and 12.

Figure 2:
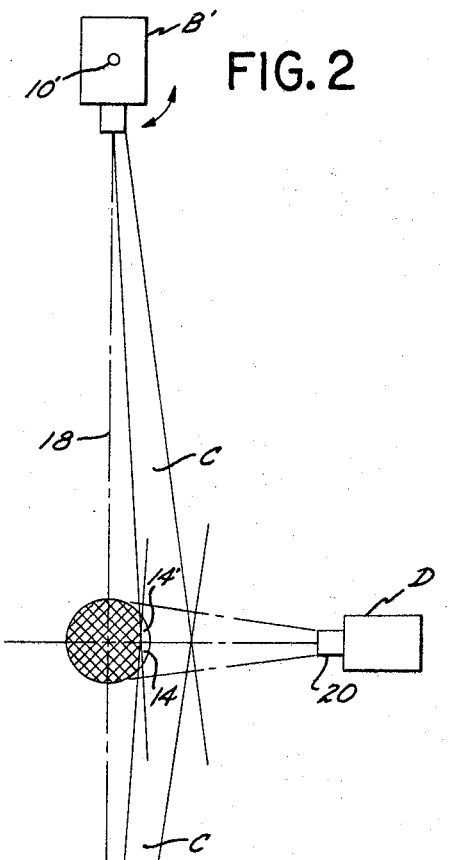
FIGURE 2 is a top plan view of two oppositely disposed light projectors and a motion picture camera arranged to concurrently illuminate two adjacently situated quadrants of an object as the two beams of light from said projectors sweep thereacross.

An alternate arrangement of the apparatus is shown in FIGURE 2, which is identical to the first form, other than a second light projector B' is provided that is oppositely disposed from the projector B and spaced from the object A. The projectors B and B' are longitudinally aligned on the center line 18.

In using the modified form of the apparatus, the projects B and B' are rotated concurrently in a counter clockwise direction (FIGURE 2), whereby the projectors, due to the beams C and C', concurrently illuminate sections 14 of the quadrant of the object A most adjacent to the motion picture camera D. Instead of obtaining light images 26 and 42 that are semicircular, the object A would be so illuminated that circular images (not shown) are obtained.

When the films containing such images are used in reproducing the object A by the method previously described and as illustrated in FIGURE 5, reproductions of one-half the object A are obtained rather than one-quarter reproductions obtained when the first form of the apparatus is used. It will be noted in FIGURE 5 that by varying the distance of the second projector F and the film 24 from the block E, the light images 26a to 26f or 42a to 42f may be larger or smaller than the section of the object A to be reproduced, whereby the reproduced object may be made smaller or larger than the original object A without difficulty, and with the assurance that the reproduced object is true and accurate.

After the forward half of the object A has been reproduced in the manner described, the rear half of the object may be reproduced in the same manner, and the reproduced portions bonded together back-to-back to provide a whole reproduction. The cavity A" shown in FIGURE 12 can be used to reproduce a portion of the object A by serving as a mold.

I claim:
1. A method of producing three-dimensional reproductions of an object, including the steps of:
 (a) disposing said object at a fixed position;
 (b) generating a first beam of light at a source a fixed distance from said object, which first beam of light is directed towards said object and is at least as wide as the width of that portion of said object to be reproduced;
 (c) disposing a plurality of unexposed photographic films at a fixed location spaced from said object, with said source and location lying in substantially the same plane, which source and location are angularly separated from one another;
 (d) sweeping said first beam across a quadrant of said object most adjacent to said location, with said first beam at either the beginning or end of said sweep fully illuminating said quadrant;
 (e) exposing said films in timed sequence to the lighted portion of said object as said first beam sweeps thereacross;
 (f) developing said films after exposure, with each of said films having an image of a lighted portion of said object thereon;

(g) providing a block of etchable material;

(h) generating a second beam of light at timed intervals at a second source spaced from a flat surface of said block, which second beam is directed to fall on said flat surface;

(i) intermittently interposing said films in the sequence in which they were exposed in said second light beam between said second source and said flat surface to permit said images on said films to be reproduced on said flat surface;

(j) intermittently applying layers of a photosensitive resist to said flat surface in such timed sequence that each of said reproduced images is directed onto an unexposed layer of said resist, which resist is soluble in a developer unless said resist has been exposed to light prior to contact with said fluid;

(k) subjecting said exposed resist to said developer to dissolve said unexposed portion of said resist;

(l) exposing said layers and said flat surface to an etching fluid for substantially uniform periods of time, with each of said periods starting after a layer of said resist has been applied to said flat surface and exposed to said second beam after it has passed through one of said films, with said block being etched to reproduce said portion of said object that was illuminated thereon.

2. A method as defined in claim 1 wherein said films are of a type on which said images of the lighted sections of said object are transparent areas thereon after said films are developed, with said reproduction of said object projecting outwardly from said block.

3. A method as defined in claim 1 in which said films are of a type on which said images of said lighted sections are opaque areas thereon after said films are developed, with said reproduction of said object being defined by a cavity in said block.

4. A method as defined in claim 1 wherein said first beam of light has a diffused leading edge to control the degree of rounding of the edge of each etched layer.

5. A method of producing three-dimensional reproductions of an object, including the steps of:

(a) disposing said object at a fixed position;

(b) generating two first beams of light at two first sources on opposite sides of said object, each of which first beams are directed towards said object, with said beams at said object being at least as wide as the width of the portion of said object desired to be reproduced;

(c) disposing a plurality of unexposed photographic films at a fixed location spaced from said object, with said source and location lying in substantially the same plane, and said source and location being angularly separated from one another;

(d) concurrently sweeping said first beams at uniform velocity across the half of said object most adjacent to said location, with said first beams at either the beginning or end of said sweep fully illuminating said half of said object most adjacent said location;

(e) exposing said films in uniform timed sequence to the lighted sections of said object as said first beam sweeps thereacross;

(f) developing said films after exposure, with each of said films having an image of a lighted section of said object thereon;

(g) providing a block of etchable material;

(h) generating a second beam of light at timed intervals at a second source spaced from a flat surface of said block, with said second beam being directed to fall on said flat surface;

(i) intermittently interposing said films in the sequence in which they were exposed to said second light beam between said second source and said flat surface to permit said images on said films to be reproduced on said flat surface;

(j) intermittently applying layers of a photosensitive resist to said flat surface in such timed sequence that each of said reproduced images is directed onto an unexposed layer of said resist, with said resist benig soluble in a developer unless said resist has ben exposed to light prior to contact with said fluid;

(k) subjecting said exposed resist to said developer to dissolve said unexposed portion of said resist;

(l) intermittently exposing said layers and said flat surface to said fluid for substantially uniform periods of time, with each of said periods starting after a layer of said resist is applied to said flat surface and exposed to said second beam after it has passed through one of said films, and said block being sequentialy etched to reproduce a portion of said object.

6. A method as defined in claim 5 wherein said films are of a type that said images of said lighted sections are transparent areas thereon after said films are developed, with said reproduction of said object being defined by a cavity in said block.

References Cited

UNITED STATES PATENTS

| | | | |
|---|---|---|---|
| 1,012,762 | 12/1911 | Valentin et al. | |
| 1,485,493 | 3/1924 | Edmunds | 96—43 |
| 1,980,981 | 11/1934 | Cooke | 156—58 |
| 2,331,772 | 10/1943 | Gibson | 156—11 X |
| 2,854,336 | 9/1958 | Guthnecht | 156—11 X |
| 2,891,339 | 6/1959 | Kao | 156—58 |

ROBERT F. BURNETT, *Primary Examiner.*

WILLIAM A. POWELL, *Assistant Examiner.*

U.S. Cl. X.R.

156—58; 96—36; 161—19, 116